United States Patent [19]
Kooy

[11] Patent Number: 4,680,942
[45] Date of Patent: Jul. 21, 1987

[54] CABINET FOR CUT-OFF FLOWERS

[76] Inventor: Hermen Kooy, 46, Stommeerkade, EK Aalsmeer, Netherlands

[21] Appl. No.: 863,006

[22] Filed: May 14, 1986

Related U.S. Application Data

[62] Division of Ser. No. 600,386, Apr. 16, 1984, Pat. No. 4,608,776, which is a division of Ser. No. 403,050, Jul. 29, 1982, Pat. No. 4,458,501.

[30] Foreign Application Priority Data

Jun. 16, 1982 [NL] Netherlands ................. 8202449

[51] Int. Cl.⁴ .................................. A47F 3/04
[52] U.S. Cl. ...................................... 62/256
[58] Field of Search ............................ 62/256

[56] References Cited

U.S. PATENT DOCUMENTS

| | | | |
|---|---|---|---|
| 2,050,063 | 8/1936 | Millott | 62/256 X |
| 2,279,484 | 4/1942 | Munshower | 62/256 X |
| 3,392,543 | 7/1968 | Miller | 62/256 X |
| 3,696,630 | 10/1972 | Bressickello | 62/256 X |
| 3,827,254 | 8/1974 | MacMaster et al. | 62/256 |
| 4,458,501 | 7/1984 | Koog | 62/256 |

FOREIGN PATENT DOCUMENTS

| | | | |
|---|---|---|---|
| 2831243 | 1/1980 | Fed. Rep. of Germany | 62/256 |
| 377632 | 6/1964 | Switzerland | 62/256 |

Primary Examiner—Lloyd L. King
Attorney, Agent, or Firm—John P. Snyder

[57] ABSTRACT

A cabinet for cut-off flowers comprising at least one table to support flower boxes, a flower space bounded by cabinet walls and said table and means for cooling said cabinet.

11 Claims, 3 Drawing Figures

CABINET FOR CUT-OFF FLOWERS

CROSS-REFERENCES TO RELATED APPLICATIONS

This application is a division of my copending application Ser. No. 600,386, filed Apr. 16, 1984 and now U.S. Pat. No. 4,608,776 issued Sept. 2, 1986. application Ser. No. 600,386 was a division of application Ser. No. 403,050, filed July 29, 1982 and now U.S. Pat. No. 4,458,501 issued July 1, 1984.

BACKGROUND OF THE INVENTION

The invention relates to a cabinet for cut-off flowers, comprising at least one table to support flower boxes, a flower space bounded by cabinet walls and said table and comprising a cooling equipment.

Such a cabinet is known. In the known cabinet cold air is blown into the flower space so that the flowers stand in draft and wither.

The object of the invention is to provide a cabinet wherein the cut-off flowers can be kept well preserved so that they remain fresh for a much longer time.

To this aim the table has been provided with openings for receiving flower boxes, said openings admitting the flower boxes to extend through said openings into a cooling space.

In the cabinet according to the invention the flowers are cooled by cooling the water in the flower boxes in which the flowers have been put. In consequence thereof, a considerable cooling of the flowers can be realized, without, in an intolerable way, having the flowers stand in a draft.

Preferably, the cooling space opens via a cold air exhaust into the flower space at the level of the top side of the flower boxes. Thus even the flower space is considerably cooled by the cold air flow, streaming along the flower boxes below the flower heads, so that the flower heads are not struck by the cold air flow. In this way the flower boxes are specifically cooled.

If the cooling space not only opens into the flower space on a low level at the top side of the flower boxes, but also on a high level with a small cold air exhaust, only a small quantity of cold air is admitted in the top side of the flower space. This small quantity, however, does not cause an intolerable draft. On the other hand this cold air flow ensures the total flower space to stay fresh.

The mentioned and other features of the invention will be explained in the following description by reference to a drawing.

BRIEF DESCRIPTION OF THE DRAWING FIGURES

DETAILED DESCRIPTION OF THE INVENTION

Figure 3:
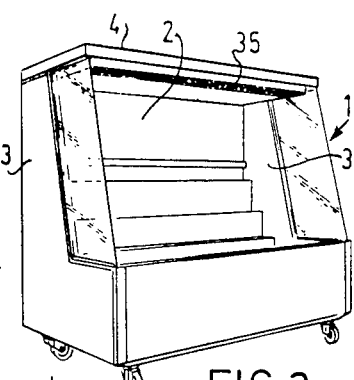
FIG. 3 is a perspective view on a smaller scale of the cabinet of FIG. 1.
Figure 1:
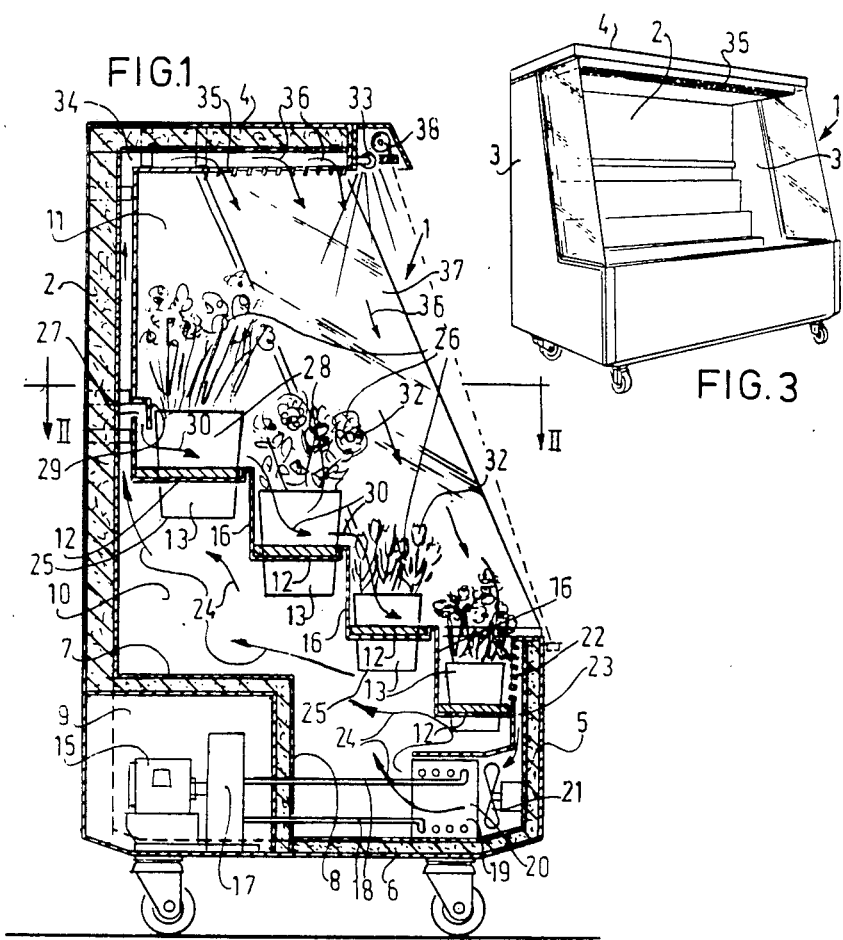
FIG. 1 is a vertical cross section through a preferred embodiment of the cabinet according to the invention.
Figure 2:
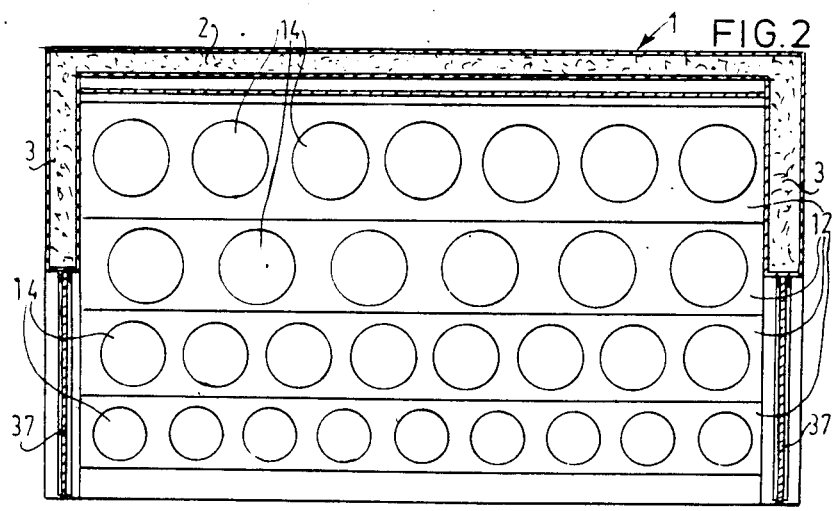
FIG. 2 is a horizontal cross section over line II—II in FIG. 1.

The cabinet 1 has isolating walls, namely a back wall 2, side walls 3, a top wall 4, a front wall 5, a bottom wall 6, and intermediate walls 7 and 8. The intermediate walls 7 and 8 separate a motor space 9 from a cooling space 10. The cooling space 10 is separated from a flower space 11 by means of a series of tables 12 and vertical strips 16, mounted between the tables 12 and adjoining same. The horizontal tables 12 are amphitheatrically arranged. The tables 12 are provided with openings 14 permitting flower boxes 13 to reach through said openings 14 into the cooling space 10. Preferably the flower boxes 13 are conical and consist for instance of pails. Their outer diameter is preferably chosen so that the major part of the flower boxes reaches into the cooling space 10 and a top part only protrudes above the tables 12. The flower boxes 13 and the openings 14 of the most backward and highest table 12 are preferably the largest and their dimensions decrease stepwise in the direction of the lowest front table 12 (see FIG. 2).

The motor area 9 houses a motor 15 and a compressor 17 of the cooling equipment driven by said motor 15. The compressor 17 is connected through conduits 18 to an evaporator 19 opening into the cooling space 10. The inlet 20 of the evaporator 19 is provided with a ventilator 21 sucking air from the flower space 11 through a channel 23 and a grid 22. The cold air flows from the evaporator 19 as indicated by arrows 24 through the cooling space 10 and thus along the lower ends 25 of the flower boxes 13, thereby considerably cooling the water in the flower boxes 13 and consequently the flowers 26, standing in the water.

The cooling space 10 opens via cold air exhaust 27 at the level of the top ends 28 of the flower boxes 13 into flower space 11. The cold air exhaust 27 consists of a narrow horizontal slit extending mainly over the length of the cabinet 1. The exhaust 27 bears a downwardly directed guiding strip 29, aiming the cold air flow as indicated by arrows 30 downwardly over the tables 12 along the top ends 28 of the flower boxes 13, and thus below the flower heads 32 of the flowers 26, standing in the flower boxes, in the direction of the cold air outlet, consisting of a grid 22.

At the inner side of the back wall 2 and top wall 4 an air channel 34, extending along the length of the cabinet 1, has been arranged, through which channel 34 a small quantity of cold air is introduced through a grid 35 in the top part of the flower space 11 according to arrows 36. This small quantity of cold air is just sufficient to keep the flower space 11 cool without causing an inadmissable cold air stream along the flower heads 32. The flower space 11 is bounded by isolated walls 2, 3 and 4 and the tables 12 with strips 16 and further by glass sheets 37, while the front side of the flower space 11 is open, so that the flowers are well visible and can be easily reached. In order to close the flower space 11 at night, a roller curtain 38 has been installed; the lines indicate the position of the roller curtain when it covers the front side of the cabinet 1. The top wall 4 has been provided with an illumination equipment 33.

What is claimed is:

1. Apparatus for preserving cut flowers while on display comprising:

cabinet means including an upper portion spaced from a lower portion thereof to define a generally vertically extending viewing and access opening therebetween, said cabinet means having a display space and separate cooling space therein;

flower container means within said cabinet and having a body of water therein and an open upper end for receiving cut flowers with the stems thereof immersed in said water and the blooms thereof disposed in said display space;

cooling means for cooling air in said cooling space;

circulating means for forcibly recirculating air through said cooling space into said display space and thence back into said cooling space for cooling the flower blooms without subjecting the blooms to an intolerable draft of cooled air; and means for supporting said flower container means within the cabinet so that the lower portion of the flower container means is below said display space and is in communication with cooled air in said cooling space to cool the water in the container means and thereby provide considerable cooling of the flowers having the stems thereof immersed in said water, the upper open end of the container means being in communication with the cooled air in said display space.

2. Apparatus as defined in claim 1 wherein said flower container means comprises a plurality of separate containers each having a separate body of water therein.

3. Apparatus as defined in claim 1 wherein said cabinet means includes means providing communication between a lower region of said display space and said cooling space, and further means providing communication between said cooling space and an upper region of said display space remote from said lower region, said cooling means being disposed within said cooling space so that the circulated air is cooled after it leaves said lower region and before it is directed against said container means.

4. Apparatus as defined in claim 1 wherein a first portion of the flower container means is disposed in said cooling space and a second portion of said flower container means is disposed in said display space.

5. Apparatus as defined in claim 1 including means for flowing a portion of the cooled air into the display space below the flower blooms and into contact with the associated flower container means.

6. Apparatus for preserving cut flowers while on display comprising:

cabinet means including an upper portion spaced from a lower portion thereof to define a generally vertically extending viewing and access opening therebetween which is normally open during operation, means within the cabinet dividing the cabinet into a display space and a cooling space;

a cooled air outlet in the cabinet means through which cooled air is discharged downwardly into said display space to form an interface between cooled air and ambient air and cool the flower blooms without subjecting the blooms to an intolerable draft of cooled air;

flower container means within said cabinet means and having a body of water therein and an open upper end for receiving cut flowers with the stems thereof immersed in said water and the blooms thereof disposed in said display space;

cooling means for cooling air in said cooling space;

circulating means for forcibly recirculating air through said cooling space and said air outlet into said display space and thence back into said cooling space;

and means for firstly directing cooled air of the cooling space onto a lower portion of said flower container means below the display space to cool the water therewithin to provide primary cooling of the flowers and subsequently directing cooled air downwardly into the display space onto said blooms to provide secondary cooling of the flowers without subjecting the blooms to an intolerable draft.

7. Apparatus as defined in claim 6 wherein said container means comprises a plurality of separate containers each having a separate body of water therein.

8. Apparatus as defined in claim 6 wherein said cabinet means includes means providing communication between a lower region of said display space and said cooling space remote from said cooled air outlet, said cooling means being disposed within said cooling space downstream of said display space and upstream of said cooled air outlet, the circulated air being cooled after it leaves said lower region and before it is directed against said container means.

9. Apparatus as defined in claim 6 wherein a first portion of the flower container means is disposed in said cooling space and a second portion of said flower container means is disposed in said display space.

10. Apparatus as defined in claim 6 including means at an intermediate portion of said cabinet means for flowing a portion of the cooled air into the display space below the flower blooms and into contact with the associated flower container means.

11. Apparatus as defined in claim 10 including means for directing said portion of the cooled air in a downward direction.

* * * * *